US008766539B2

(12) United States Patent
Espiau et al.

(10) Patent No.: US 8,766,539 B2
(45) Date of Patent: Jul. 1, 2014

(54) ELECTRODELESS LAMPS WITH GROUNDED COUPLING ELEMENTS AND IMPROVED BULB ASSEMBLIES

(75) Inventors: Frederick M. Espiau, Topanga, CA (US); Timothy J. Brockett, Oakland, CA (US); Mehran Matloubian, Encino, CA (US); Douglas A. Doughty, Gilroy, CA (US)

(73) Assignee: Topanga USA, Inc., Canoga Park, CA (US)

( * ) Notice: Subject to any disclaimer, the term of this patent is extended or adjusted under 35 U.S.C. 154(b) by 1208 days.

(21) Appl. No.: 12/685,650

(22) Filed: Jan. 11, 2010

(65) Prior Publication Data
US 2010/0134008 A1 Jun. 3, 2010

Related U.S. Application Data

(63) Continuation-in-part of application No. 12/484,933, filed on Jun. 15, 2009, now Pat. No. 7,830,092.

(60) Provisional application No. 61/075,735, filed on Jun. 25, 2008.

(51) Int. Cl.
*H05B 37/00* (2006.01)
*H05B 41/16* (2006.01)

(52) U.S. Cl.
USPC .............................. 315/39; 315/248

(58) Field of Classification Search
USPC ............... 315/39, 248, 39.3; 362/551, 562; 313/160–161, 153–154, 549, 551, 313/231.31, 231.41, 231.61, 231.71
See application file for complete search history.

(56) References Cited

U.S. PATENT DOCUMENTS

| | | | |
|---|---|---|---|
| 4,975,655 A | 12/1990 | Dawson et al. | |
| 5,637,963 A | 6/1997 | Inoue et al. | |
| 5,686,793 A | 11/1997 | Turner et al. | |
| 5,777,857 A | 7/1998 | Degelmann | |
| 5,834,895 A | 11/1998 | Dolan et al. | |
| 5,838,108 A | 11/1998 | Frank et al. | |
| 5,886,480 A | 3/1999 | Penzenstadler et al. | |
| 5,923,122 A | 7/1999 | Frank et al. | |
| 6,137,237 A | 10/2000 | MacLennan et al. | |
| 6,241,369 B1 | 6/2001 | Mackiewicz | |
| 6,348,669 B1 * | 2/2002 | Rudd Little et al. | 219/121.43 |
| 6,476,557 B1 * | 11/2002 | Leng et al. | 313/637 |
| 6,617,806 B2 | 9/2003 | Kirkpatrick et al. | |
| 6,737,809 B2 | 5/2004 | Espiau et al. | |
| 6,922,021 B2 | 7/2005 | Espiau et al. | |

(Continued)

OTHER PUBLICATIONS

Bogaerts, et al., "Gas Discharge Plasmas and their Applications," Spectrochimica Acta, Part B 57, 2002, pp. 609-658.

(Continued)

*Primary Examiner* — Minh D A
(74) *Attorney, Agent, or Firm* — Kilpatrick Townsend & Stockton LLP

(57) ABSTRACT

An electrode-less plasma lamp, comprising generally of a bulb containing a gas-fill and light emitter(s) that is excited to produce light using radio-frequency (RF) energy. The present lamp includes compact air resonators/waveguides that use grounded coupling-elements with integrated bulb assemblies to reduce the size of the resonator and improve the performance of the lamp as well as reduce cost and simplify manufacturability.

14 Claims, 17 Drawing Sheets

(56) References Cited

U.S. PATENT DOCUMENTS

| | | |
|---|---|---|
| 7,119,641 B2 | 10/2006 | Petrov et al. |
| 7,291,785 B2 | 11/2007 | Riester et al. |
| 7,291,985 B2 * | 11/2007 | Espiau et al. ............. 315/248 |
| 7,348,732 B2 | 3/2008 | Espiau et al. |
| 7,350,936 B2 | 4/2008 | Ducharme et al. |
| 7,358,678 B2 | 4/2008 | Espiau et al. |
| 7,362,054 B2 | 4/2008 | Espiau et al. |
| 7,362,055 B2 | 4/2008 | Espiau et al. |
| 7,362,056 B2 | 4/2008 | Espiau et al. |
| 7,372,209 B2 | 5/2008 | Espiau et al. |
| 7,391,158 B2 * | 6/2008 | Espiau et al. ............. 315/39 |
| 7,719,195 B2 | 5/2010 | DeVincentis et al. |
| 7,830,092 B2 | 11/2010 | Espiau et al. |
| 2006/0250090 A9 | 11/2006 | Guthrie |
| 2008/0054813 A1 | 3/2008 | Espiau et al. |

OTHER PUBLICATIONS

International Search Report and Written Opinion of PCT Application No. PCT/US09/048174, mailed on Aug. 17, 2009, 17 pages total.

Notice of Allowance for U.S. Appl. No. 12/484,933, mailed on Jul. 23, 2010, 6 pages.

* cited by examiner

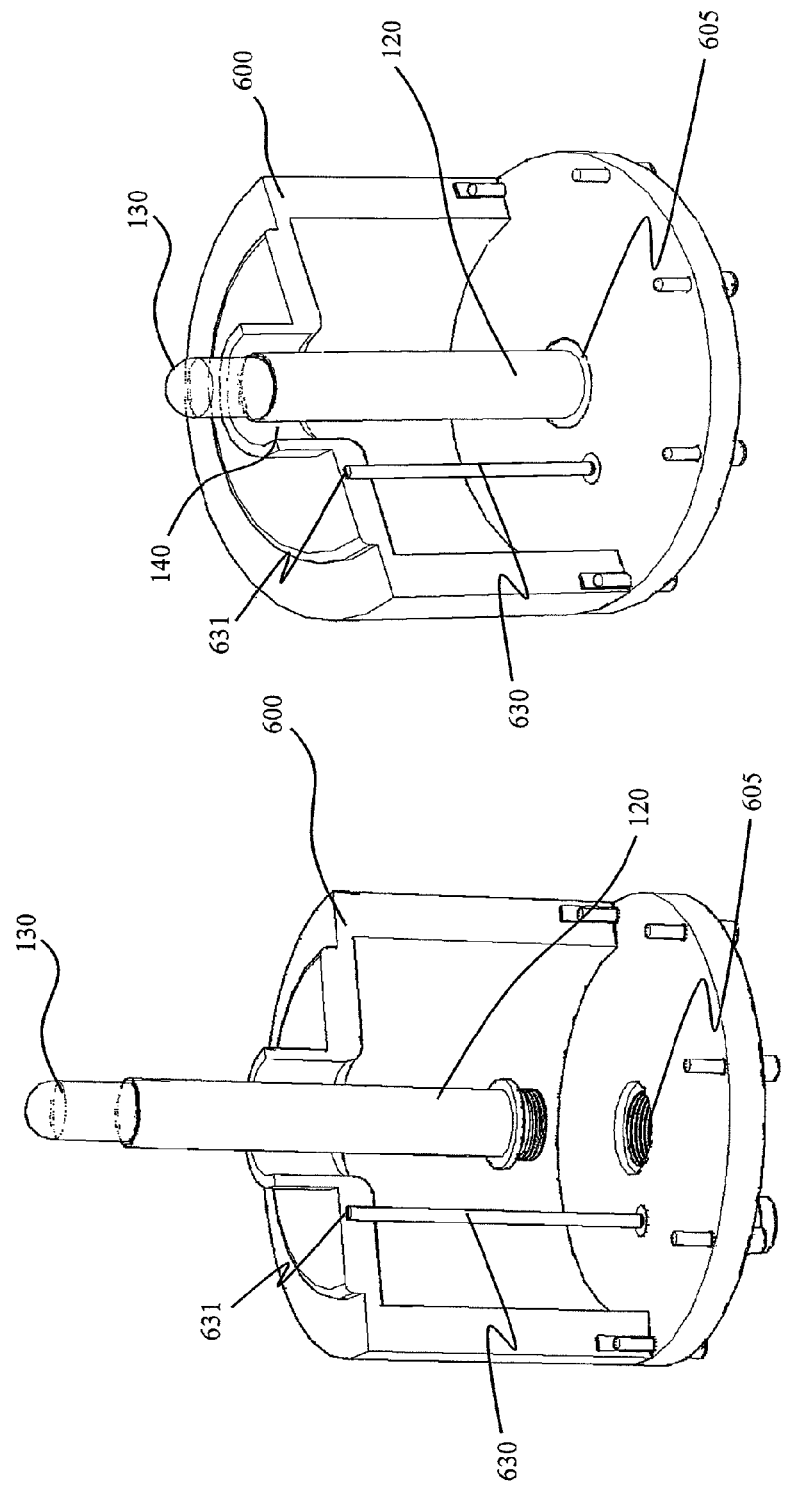

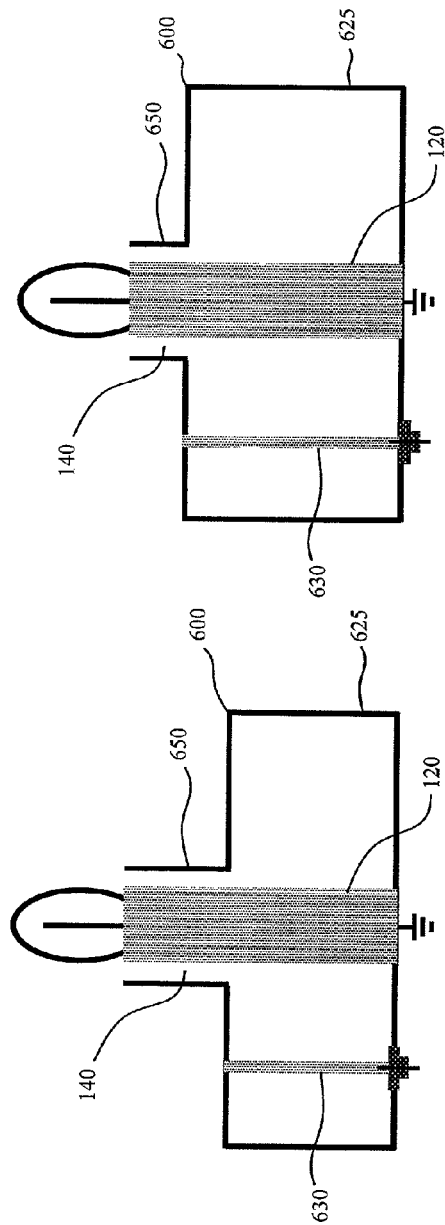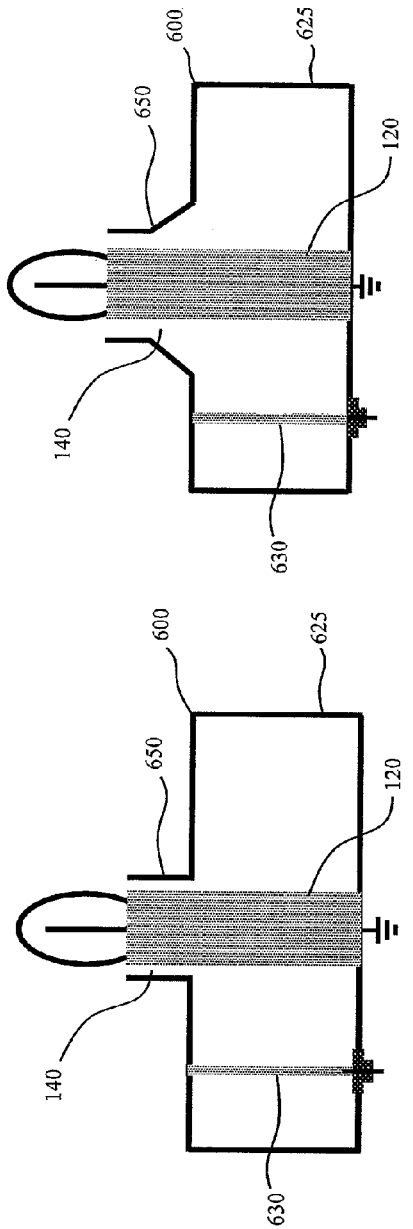

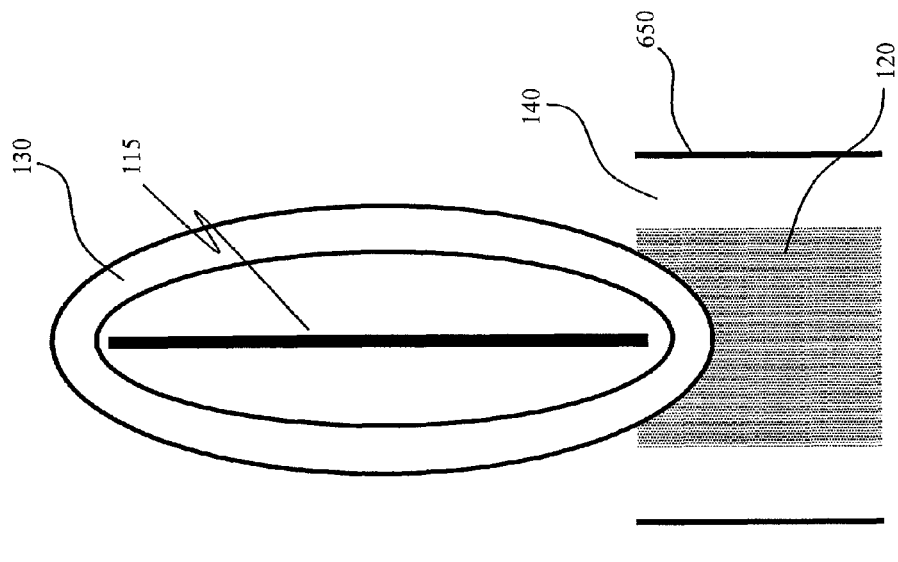
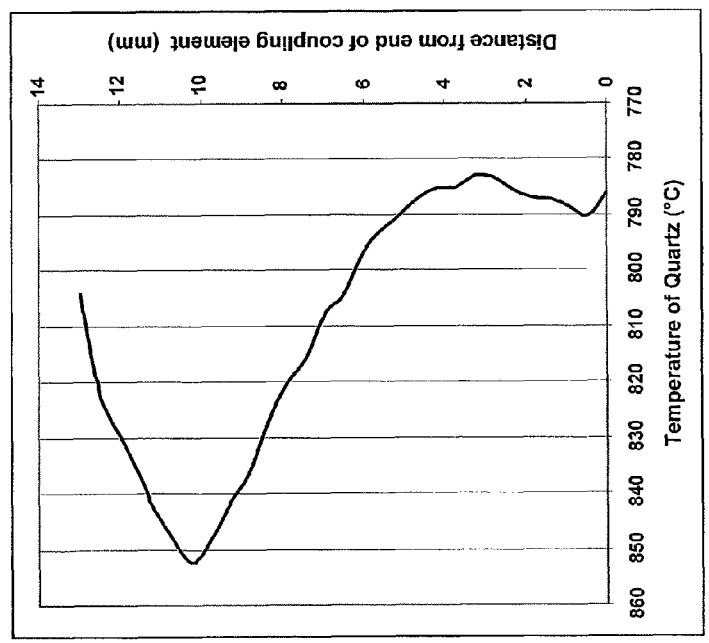
FIG. 11

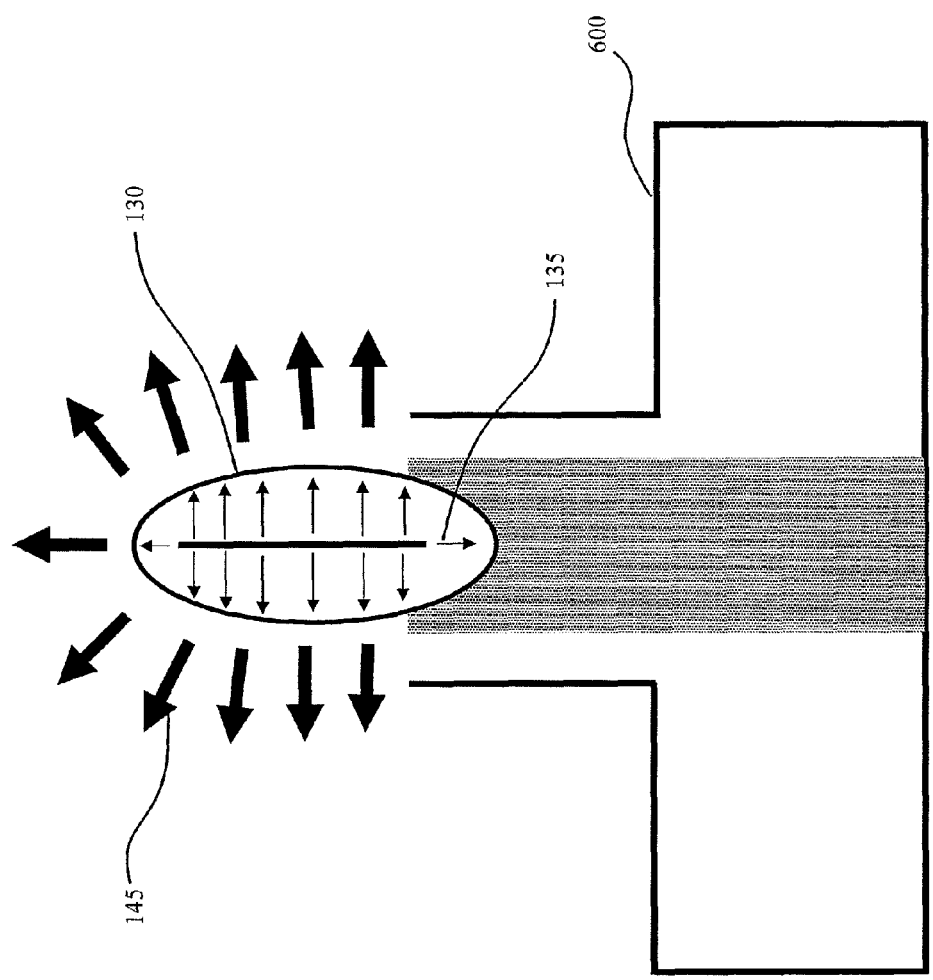

ELECTRODELESS LAMPS WITH GROUNDED COUPLING ELEMENTS AND IMPROVED BULB ASSEMBLIES

CROSS-REFERENCE TO RELATED APPLICATION

This application is a continuation in part and also claims priority to U.S. application Ser. No. 12/484,933, filed Jun. 15, 2009, which claims priority to U.S. Provisional Ser. No. 61/075,735 filed Jun. 25, 2008, all commonly assigned, and hereby incorporated by reference for all purposes.

BACKGROUND OF THE INVENTION

The present invention is directed to devices and methods for generating light with plasma lamps. More particularly, the present invention provides plasma lamps driven by a radio-frequency source without the use of electrodes inside the bulb and related methods. Merely by way of example, such plasma lamps can be applied to applications such as stadiums, security, parking lots, military and defense, street lighting, large and small buildings, vehicle headlamps, aircraft landing, bridges, warehouses, uv water treatment, agriculture, architectural lighting, stage lighting, medical illumination, microscopes, projectors and displays, any combination of these, and the like.

Plasma lamps provide extremely bright, broadband light, and are useful in applications such as general illumination, projection systems, and industrial processing. The typical plasma lamp manufactured today contains a mixture of gas and trace substances that is excited to form a plasma using a high current passed through closely spaced electrodes. This arrangement, however, suffers from deterioration of the electrodes inside the bulb, and therefore a limited lifetime. Other limitations also exist with conventional plasma lamps.

From the above, it is seen that techniques for improving plasma lamps are highly desirable.

BRIEF SUMMARY OF THE INVENTION

According to the present invention, techniques directed to devices and methods for generating light with plasma lamps are provided. More particularly, the present invention provides plasma lamps driven by a radio-frequency source without the use of electrodes inside the gas filled vessel (bulb) and related methods. As an example, the radio-frequency source is coupled to the gas filled vessel using a compact air resonator/waveguide. In one or more embodiments, the resonator/waveguide is not made using or is generally free from a dielectric material such as alumina or quartz. In a preferred embodiment, the compact air resonator is arranged in a relatively small space and may have dimensions substantially less than the half of the free-space wavelength (lambda/2) of the resonant frequency of the resonator. In addition the arc of the gas filled vessel (bulb) is substantially not surrounded by the body of the resonator/waveguide allowing the use of reflectors and other optical components used in designing luminaires. That is, the gas filled vessel is substantially includes the arc, which is substantially free from any mechanical blockage by one or more portions of the body of the resonator waveguide, which allows the use of such reflectors and other optical components. Merely by way of example, such plasma lamps can be applied to applications such as stadiums, security, parking lots, military and defense, street lighting, large and small buildings, bridges, warehouses, agriculture, uv water treatment, architectural lighting, stage lighting, medical illumination, microscopes, projectors and displays, any combination of these, and the like. Of course, there can be other variations, modifications, and alternatives.

In a specific embodiment, the present invention provides a plasma electrodeless lamp. The lamp comprises a conductive body that is substantially hollow (air cavity), closely receiving two coupling elements. The two coupling elements include a first coupling element connected to the output of an RF amplifier, and a second coupling element connected to the input of an RF amplifier. As used herein, the terms "first" and "second" are not limited to order, but shall be interpreted by ordinary meaning. The other end of the first coupling element is conductively connected (grounded) to the conductive body at its top surface, while the second coupling element is not connected to ground and is at a different potential. The lamp further comprises a bulb-coupling element assembly, which is grounded to the conductive body of the lamp body at its bottom surface. Electromagnetic energy is RF-coupled between the first coupling element and the bulb-coupling element assembly, and between the bulb-coupling element assembly and the second coupling element. Electromagnetic energy is capacitively, or inductively or a combination of inductively and capacitively coupled to the bulb within the bulb-coupling element assembly. The lamp may further comprise a reflector to direct the luminous output of the bulb in the bulb-coupling element assembly. Alternatively, the lamp is free from any reflector design or the like. The lamp further may comprise a ground strap to conductively connect to or be coupled to the top of the bulb-coupling element assembly to the conductive lamp body. Alternatively, the ground strap may conductively connect or be coupled to the top of the bulb-coupling element assembly to the reflector, which in turn is conductively connected to the lamp body.

In another embodiment, the present lamp may include a second coupling element that is removed, and the first coupling element is connected to the output of an RF source, which may further comprise an RF oscillator and amplifier. In a preferred embodiment, the lamp consists only of the first coupling element and the bulb-coupling element assembly.

In yet another embodiment, the lamp body comprises a metallic conductive body that is partially filled with a dielectric insert. In one or more embodiments, the dielectric insert may be a single material, layered, a composite, or other suitable spatial configurations and/or materials.

In a specific embodiment, the present invention provides an alternative electrodeless plasma lamp. The lamp includes a gas filled vessel having a transparent or translucent body configured by an inner region and an outer surface region with a cavity being defined within the inner region. The gas filled vessel typically contains an inert gas such as Argon or Xenon (or combination of inert gases) and one or more light emitters such as Mercury, Indium Bromide, Sulfur, Cesium Bromide, among others. An air resonator region substantially surrounded by a conductive body configured within a vicinity of the gas filled vessel. The air resonator region (i.e., conductive body) having a maximum dimension of less than ½ of the free space wavelength of the fundamental resonant frequency of the air resonator region. An input coupling element couples RF energy into the air resonator/waveguide. One end of the input coupling element is connected to an RF source including an oscillator and an amplifier. The other end of the input coupling element is connected to or is coupled to the conductive body of the resonator/waveguide. The RF energy inside the air resonator/waveguide is coupled to an output coupling (bulb-coupling) element. One end of the output coupling element is connected to or coupled to the conductive body of the resonator/waveguide and the other end of the output coupling element is connected to the bulb. The lengths of the input and output coupling elements and the separation between them can be adjusted to optimize RF energy transfer between the RF source and the gas filled vessel (bulb). RF energy ionizes the gas inside the bulb and vaporizes the light emitter(s) resulting in electromagnetic radiation from the bulb in the visible and/or ultra violet and/or infrared part of the spectrum.

In one or more embodiments, the resonant frequency of the compact air resonator/waveguide depends on other parameters, alone or in combination. Such parameters may include the length of the output coupling (bulb-coupling) element or the inductance of the output coupling element, the diameter of the output coupling element, the separation between the output coupling element along its length and the walls of conductive body of the resonator/waveguide resulting in changing the capacitance of the resonator, alone or in combination, among others. By increasing the effective capacitance and inductance of the air resonator/waveguide the dimensions of the resonator can be reduced substantially to less than the free space half-wavelength of the fundamental resonant mode of the resonator. The compact air resonator/waveguide is substantially smaller than the air resonator in conventional apparatus, such as those described in U.S. Pat. No. 6,476,557B1.

In a specific embodiment, the present invention provides a plasma lamp apparatus. The apparatus includes a gas filled vessel having a transparent or translucent body configured by an inner region and an outer surface region, a cavity being defined within the inner region. The apparatus also has an air resonator region configured within a vicinity of the gas filled vessel. In a specific embodiment, the air resonator region has a maximum dimension of less than ½ of the free space wavelength of the fundamental resonant frequency of the air resonator region. The apparatus has an rf source configured to generate a resonant frequency of 2.5 GHz and less and coupled to the air resonator region.

In alternative specific embodiments, the present invention provides an alternative plasma lamp apparatus. The apparatus has a waveguide body having a maximum dimension of less than ½ of a free space wavelength of a resonant frequency. The maximum dimension is selected from any one dimension in a three coordinate system.

In still an alternative embodiment, the present invention provides still an alternative plasma lamp apparatus. The apparatus has a gas filled vessel having a transparent or translucent body configured by an inner region and an outer surface region and a cavity being defined within the inner region. In a specific embodiment, the gas filled vessel has a first end portion and a second end portion. The apparatus has a maximum temperature profile spatially disposed within a center region of the gas filled vessel. In a specific embodiment, the center region is between the first end portion and the second end portion. In a preferred embodiment, the maximum temperature profile is within a vicinity of the outer surface region substantially free from interference with a solid resonator body region.

Still further, the present invention provides a plasma lamp apparatus. The apparatus comprises a gas filled vessel having a transparent or translucent body configured by an inner region and an outer surface region, a cavity being defined within the inner region; and an rf source coupled to the gas filled vessel to cause electromagnetic radiation to pass through at least 50% of the outer surface region without reflection back into the inner region of the gas filled vessel.

Moreover, the present invention provides a method for emitting electromagnetic radiation from a plasma lamp apparatus. The method includes generating electromagnetic radiation from within an inner region of a gas filled vessel using at least one or more rf sources configured to provide rf energy to the gas filled vessel and transmitting a portion of the electromagnetic radiation from the inner region of the gas filled vessel through at least 50% of an outer surface region of the gas filled vessel without substantial refection back into the inner region of the gas filled vessel.

Still further, the present invention provides an electrode-less plasma lamp apparatus in yet an alternative embodiment. The apparatus has a gas filled vessel having transparent or translucent body configured by an inner region and an outer surface region, a cavity being defined within the inner region, which is free from one or more electrode structures. The apparatus has a support body configured to mate with the gas filled vessel and an arc feature caused by electromagnetic radiation and having a first end and a second end provided spatially within the inner region. In a preferred embodiment, at least 50% of the arc feature is exposed when viewed from any spatial position within 360 Degrees and greater of an imaginary line normal to a center portion between the first end and the second end of the arc feature. In one or more embodiments, the arc feature is provided within the spatial region between a first end and a second end of the inner region.

In yet other embodiments, the present invention provides an electrode-less plasma lamp apparatus. The apparatus has a gas filled vessel having transparent or translucent body configured by an inner region and an outer surface region and a cavity being defined within the inner region, which is free from one or more electrode structures. The apparatus also has a maximum electric field region configured within a portion of the inner region of the gas filled vessel. In a specific embodiment, the maximum electric field region is exposed from an exterior region of the gas filled vessel when viewed from any spatial position within 360 Degrees and greater of an imaginary line normal to a center portion of the gas filled vessel.

In one or more embodiments, the invention preferably provides a single source plasma lamp apparatus. The apparatus has a single point source configured to be electrode-less and having a maximum dimension of 3 centimeters and less and an emission of electromagnetic radiation having at least 20,000 lumens emitted from the single point source.

In preferred embodiments, the plasma lamp apparatus comprises a spatial gap disposed between an rf coupling element and an output coupling element, which is coupled to a gas filled vessel.

A device is also provided in one or more embodiments. The device comprises an rf source; an electromagnetic resonator structure coupled to at least one rf coupling element configured to introduce rf energy into the electromagnetic resonator structure and a bulb comprising a fill material. The bulb is coupled to the electromagnetic resonator structure to emit electromagnetic energy from a spectrum of at least ultraviolet, visible, or infrared; and an exposed region of the bulb protruding outside of the electromagnetic resonator structure to cause a substantial portion of the electromagnetic radiation to be emitted from exterior surfaces of the bulb without reflection from the electromagnetic resonator structure. In one or more embodiments, the spectrum may include combinations of the above as well as other regions. Of course, there can be various combinations, alternatives, and variations.

One or more benefits may be achieved using the present lamp and related methods. As an example, the present lamp is compact and can be configured inside conventional luminaires, such as luminaires used for street lighting and parking lot lighting, among other applications. Furthermore, the present lamp can be configured to have an exposed arc to allow use of conventional optical components, such as aluminum reflectors, diffusers, and other components, alone or in combination. In one or more embodiments, the present lamp can also be manufactured more efficiently and at lower costs than the conventional dielectric resonators, such as those described in U.S. Pat. No. 6,737,809B2. That is, the compact air resonator/waveguide is significantly lower cost and simpler to manufacture since it does not require a dielectric material (alumina) or other materials. Also by eliminating the RF losses associated with the dielectric material, the performance of the lamp improves. Furthermore, the lamp can be configured to have an exposed arc to allow use of conventional optical components. These and other benefits may be achieved in one or more embodiments. Further details of the present invention can be found throughout the present specification and more particularly below.

The present invention achieves these benefits and others in the context of known process technology. However, a further understanding of the nature and advantages of the present invention may be realized by reference to the attached drawings.

BRIEF DESCRIPTION OF THE DRAWINGS

A more complete understanding of the present invention and its advantages will be gained from a consideration of the following description of preferred embodiments, read in conjunction with the accompanying drawings provided herein. In the figures and description, numerals indicate various features of the invention, and like numerals referring to like features throughout both the drawings and the description.

FIG. 6A is a simplified cross-sectional perspective view of the lamp in FIG. 5B without the RF source and the reflector according to an embodiment of the present invention.

FIG. 6B shows a simplified diagram of the cross-sectional perspective view in FIG. 6A with the integrated bulb/output coupling element screwed into the bottom of the conductive lamp body according to an embodiment of the present invention.

FIGS. 7A, 7B, 7C, and 7D illustrate simplified diagrams of some alternative variations in the design of the compact air resonator/waveguide to achieve the same resonant frequency according to embodiments of the present invention.

FIG. 11 shows a simplified diagram of the temperature profile of the surface of the gas filled vessel (in this case a quartz bulb) as a function of the distance above the output coupling element. In this case the bulb is operated in the vertical direction.

FIG. 12B shows a simplified cross sectional view of a gas filled vessel in one of the embodiments of this invention showing that the majority of the light from the arc in this case does not get reflected back into the bulb before exiting the surface of the bulb.

DETAILED DESCRIPTION OF THE INVENTION

Figure 1:
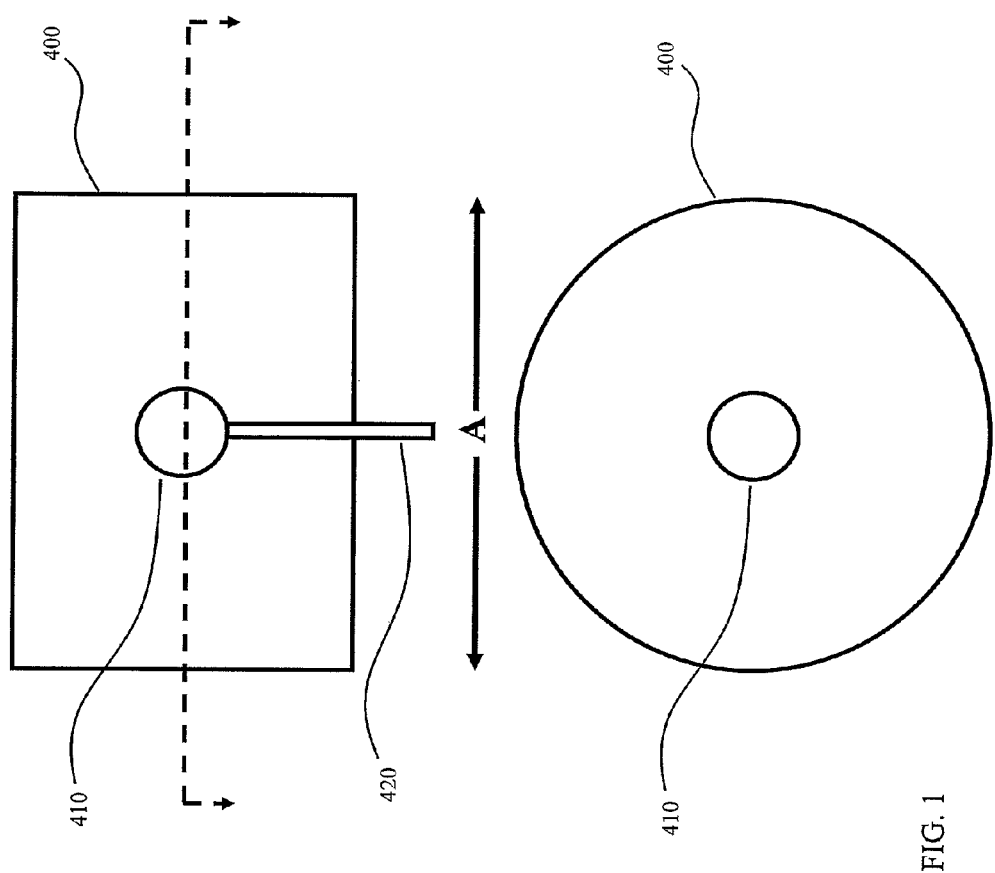
FIG. 1 illustrates an example of conventional air resonator/waveguide coupling RF energy to a gas filled vessel (bulb).

According to the present invention, techniques directed to devices and methods for generating light with plasma lamps are provided. More particularly, the present invention provides plasma lamps driven by a radio-frequency source without the use of electrodes inside a gas-filled vessel (bulb) and related methods. Merely by way of example, such plasma lamps can be applied to applications such as stadiums, security, parking lots, military and defense, street lighting, large and small buildings, bridges, warehouses, agriculture, uv water treatment, architectural lighting, stage lighting, medical illumination, microscopes, projectors and displays, any combination of these, and the like.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object. Additionally, the terms "first" and "second" or other like descriptors do not necessarily imply an order, but should be interpreted using ordinary meaning.

As background for the reader, we would like to describe conventional lamps and their limitations that we discovered. Electrodeless plasma lamps driven by microwave sources have been proposed. Conventional configurations include a gas filled vessel (bulb) containing Argon and a light emitter such as Sulfur or Cesium Bromide (see for example, U.S. Pat. No. 6,476,557B1 and FIG. 1 herein). The bulb is positioned inside an air resonator/waveguide with the microwave energy provided by a source such as a magnetron and introduced into the resonator/waveguide to heat and ionize the Argon gas and vaporize the Sulfur to emit light. To use RF sources that are efficient and low-cost it is desirable to design the resonator/waveguide to operate at frequencies below approximately 2.5 GHz and preferably below 1 GHz. A conventional air resonator/waveguide operating in the fundamental resonant mode of the resonator at 1 GHz has at least one dimension that is approximately 15 cm long since this length is about half the free-space wavelength (lambda/2) of the resonant frequency of the resonator.

This results in limitations that were discovered. Such limitations include a resonator/waveguide size that is too large for most commercial lighting applications since the resonator/waveguide will not fit within typical lighting fixtures (luminaires). In addition since the bulb was placed inside the air/resonator cavity, the arc of the bulb is not accessible for use in the design of reflectors for various types of luminaires used in commercial and industrial lighting applications.

In the configuration proposed in U.S. Pat. No. 6,737,809B2, Espiau, et al., the air inside the resonator is replaced with alumina resulting in reducing the size of the resonator/waveguide since the free-space wavelength (fundamental mode guided wavelength for this resonator/waveguide) is now reduced approximately by the square-root of the effective dielectric constant of the resonator body. See also FIG. 2. This approach has some advantages over the air resonator in U.S. Pat. No. 6,476,557B1 by reducing the size of the resonator but it has its own drawbacks. Such drawbacks may include higher manufacturing costs, losses associated with the dielectric material, and blockage of light from the bulb by the dielectric material. In this approach, the arc of the bulb is not accessible either limiting its use in various types of luminaires used in commercial and industrial lighting applications.

FIG. 1 illustrates an example of a conventional air resonator/waveguide coupling RF energy to a gas filled vessel (bulb). The air resonator 400 surrounds the gas filled vessel 410 that is attached to a stem 420. The cross section of the resonator is illustrated at the bottom of FIG. 1. The dimension A shown in the figure corresponds to the diameter of an air resonator operating at the fundamental resonant mode of 900 MHz and is approximately 16.5 cm which is about half of the free space wavelength at 900 MHz (it is typically half the free space guide wavelength which is the effective wavelength inside the waveguide). The size of this resonator is too large for most luminaires. Furthermore, the arc of the bulb is fully surrounded by the walls of the resonator making it difficult to use with conventional reflectors and optics in designing the luminaire.

Figure 2:
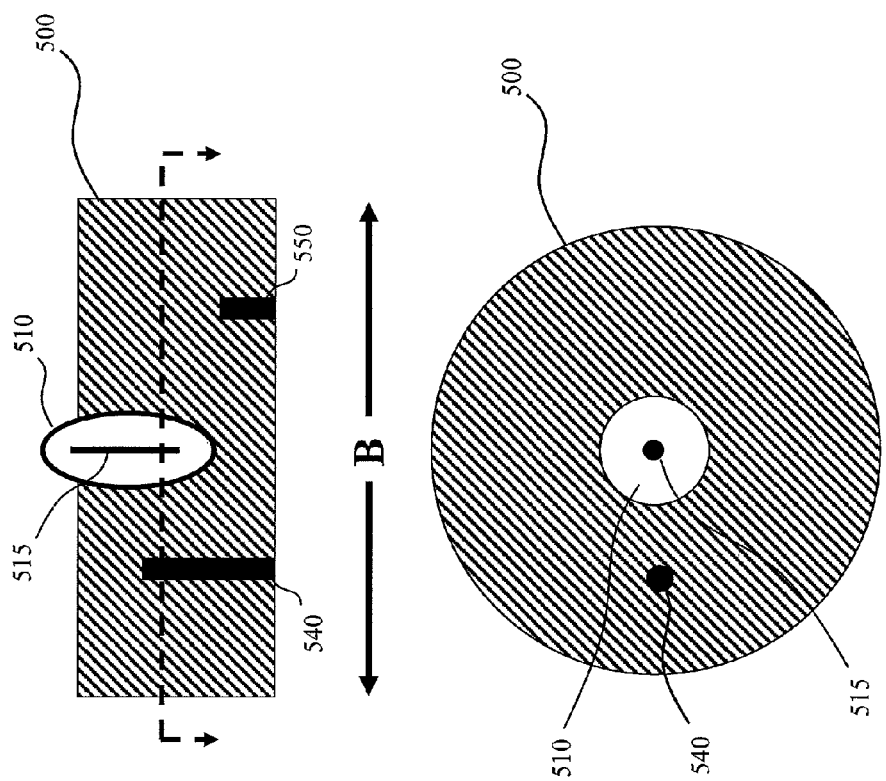
FIG. 2 illustrates an example of conventional dielectric resonator/waveguide coupling RF energy to a gas-fill vessel (bulb).

FIG. 2 illustrates an example of a conventional dielectric resonator/waveguide coupling RF energy to a gas filled vessel (bulb). The RF energy is coupled into the dielectric resonator 500 using an input probe 540. The resonator couples the RF energy to the gas filled vessel 510 that is placed inside the dielectric resonator with most of the arc 515 being surrounded by the dielectric resonator. A feedback probe 550 can be used to couple a small amount of RF energy out of the resonator and in conjunction with an amplifier and the input probe form a feedback loop to power up the lamp. The cross section of this resonator is illustrated at the bottom of FIG. 2 with dimension B corresponding to the diameter of this resonator. One advantage of this approach over an air resonator shown in FIG. 1 is that the size of the resonator (designed for fundamental mode of operation) is reduced approximately by the square root of the effective dielectric constant of the dielectric material. So for example in the case that the resonator is made from Alumina with a dielectric constant of 9.4 the diameter of a 900 MHz air resonator shown in FIG. 1 is reduced by a factor of approximately 3 to about 5.3 cm (dimension B). The drawback of this approach is that the resonator has to be made from a low RF loss dielectric material and the resonator is more expensive and more difficult to manufacture. Furthermore, most of the arc of the bulb 515 is inside the dielectric material so it is not accessible for more flexibility in the design of the optical components used in luminaires. These and other limitations have been overcome with one or more embodiments of the present invention, which will be described in more detail below.

Figure 3:
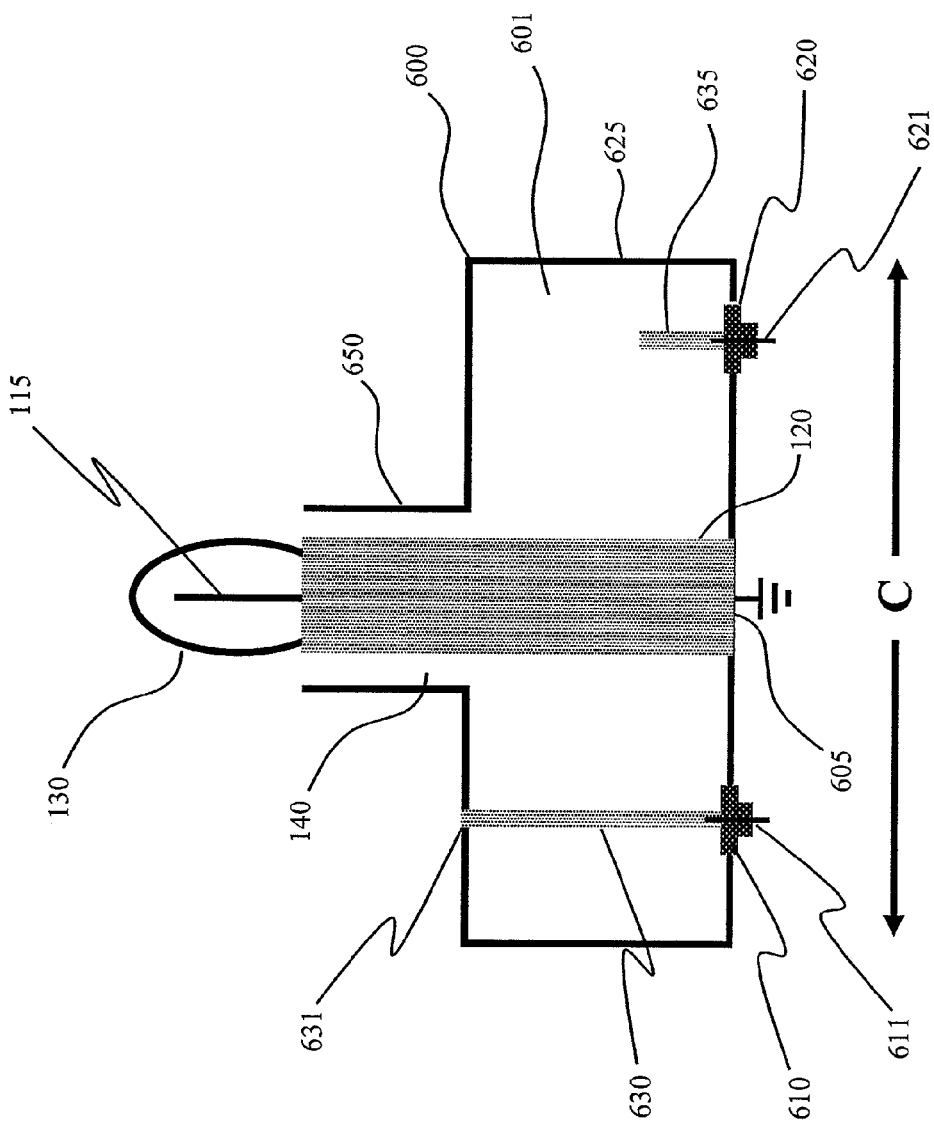
FIG. 3 is a simplified drawing of an embodiment of the present invention of a compact air resonator/waveguide comprising a conductive lamp body with air inside, an input coupling element, an integrated bulb/output coupling element, and a feedback coupling element.

FIG. 3 is a simplified drawing of an embodiment of the present invention of a compact air resonator/waveguide. This diagram is merely example, which should not unduly limit the scope of the claims herein. One of ordinary skill in the art would recognize other variations, alternatives, and modifications. The lamp housing 600 is made from an electrically conductive material. This conductivity may be achieved through the application of a conductive veneer, or through the choice of a conductive material. An example embodiment of conductive veneer is silver paint or alternatively the lamp body can be made from sheet of electrically conductive material such as aluminum. In this embodiment the lamp body consists of a wider diameter bottom section 625 and a narrower diameter 650 top section. A cylindrical lamp body is depicted, but rectangular or other shapes may be used. The input coupling element 630 is connected to the lamp body at the top surface 631 and at the other end is connected to an RF connector 611 through the opening 610 in the lamp body. The input coupling element 630 can be made from a solid or hollow conductor or alternatively from a dielectric material with an electrically conductive coating. The output coupling element 120 is connected to the lamp body at the bottom 605 and at the other end is connected to the gas filled vessel (bulb) 130. The output coupling element can be made from solid or hollow electrically conductive material or alternatively can be made from a dielectric material with an electrically conductive coating. The top end of the output coupling element is shaped to closely receive the gas filled vessel. In the case that the output coupling element is made from a solid conductor a thin layer of a dielectric material or refractory metal is used as an interface barrier between the bulb and the output coupling element. In a specific embodiment, the gas filled vessel is made of a suitable material such as quartz or translucent alumina or other transparent or translucent material. The gas filled vessel is filled with an inert gas such as Argon or Xenon and a light emitter such as Mercury, Sodium, Dysprosium, Sulfur or a metal halide salt such as Indium Bromide, Scandium Bromide, Thallium Iodide, Holmium Bromide, Cesium Iodide or other similar materials (or it can simultaneously contain multiple light emitters). Overall, RF energy is coupled capacitively, or inductively, or a combination of inductively and capacitively, by the output coupling-element 120 to the bulb 130, ionizing the inert gas and vaporizing the light emitter(s) resulting in intense light emitted from the lamp. The arc of the bulb 115 in this embodiment is not surrounded by the walls of the resonator/waveguide. The feedback coupling element 635 is connected to an RF connector 621 through an opening 620 in the lamp body. The other end of the feedback coupling element is not connected to the lamp body.

The resonant frequency of the compact air resonator/waveguide depends on a number of parameters including the diameter and length of the top (650) and bottom (625) sections, the length and diameter of the output coupling element (120), and the gap 140 between the output coupling element and the walls of the lamp body. By adjusting these parameters as well as other parameters of the compact air resonator/waveguide it is possible to design the resonator to operate at different resonant frequencies. By adjusting the lengths and the gap between the input coupling element (630) and the output coupling element (120) it is possible to optimize coupling of the RF power between an RF source and the bulb.

In one example embodiment, the bottom 625 of the lamp body 600 may consist of a hollow aluminum cylinder with a 5 cm diameter, and a height of 3.8 cm and the top portion 650 have a diameter of 1.6 cm and a height of 1.4 cm. The diameter of the input coupling element 630 is about 0.13 cm and the diameter of the output coupling element 120 is about 0.92 cm. The fundamental resonant frequency of such an air resonator/waveguide is approximately 900 MHz. By adjusting the various design parameters (dimensions of the lamp body, length and diameter of the output coupling element, gap between the output coupling element and the walls of the lamp body) as well as other parameters it is possible to achieve different resonant frequencies. Also it is possible by adjusting various design parameters to have numerous other design possibilities for a 900 MHz resonator. Based on the above example design one can see that the diameter of this air resonator/waveguide C (5 cm) is significantly smaller than air resonator A (16.5 cm) in prior art shown in FIG. 1. The compact air resonator/waveguide disclosed has significant advantages over conventional large air resonators and dielectric resonators. The smaller resonator size and exposed arc allows easy integration into existing luminaires. It does not require the use of expensive dielectric materials that will result in RF losses and difficulty in manufacturing. Another significant advantage of the invention is that the input coupling element 630 and the output coupling element 120 are respectively grounded at planes 631 and 605, which are coincident with the outer surface of the lamp body 600. This eliminates the need to fine-tune their depth of insertion into the lamp body—as well as any sensitivity of the RF coupling between them to that depth—simplifying lamp manufacture, as well as improving consistency in lamp brightness yield. This illustration is merely an example, which should not unduly limit the scope of the claims herein. One of ordinary skill in the art would recognize other variations, modifications, and alternatives.

Figure 4:
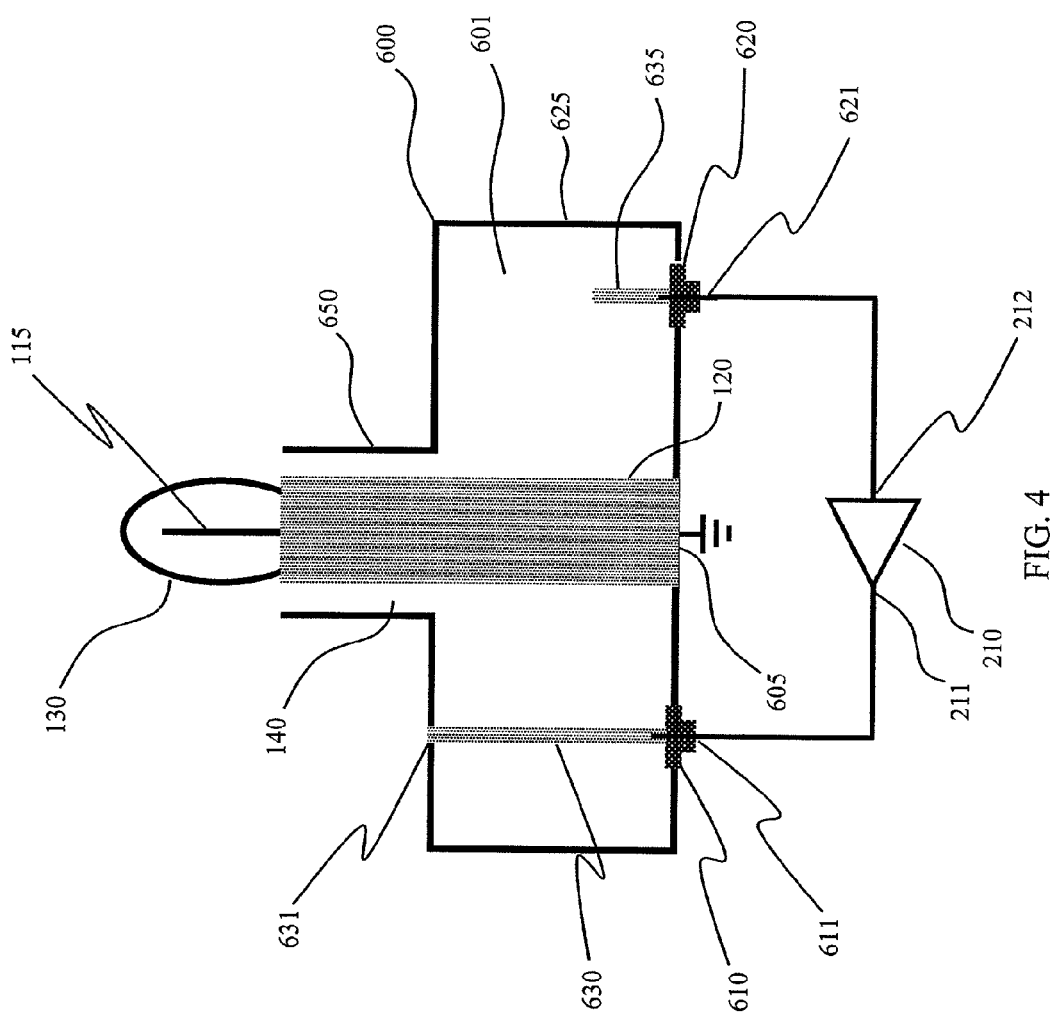
FIG. 4 illustrates a simplified diagram of the lamp in FIG. 3 with an amplifier connected between the feedback coupling element and the input coupling element providing for frequency selective oscillation in the feedback loop according to an embodiment of the present invention.

FIG. 4 illustrates the lamp shown in FIG. 3 with an RF amplifier 210 connected between the feedback coupling element 635 and the input coupling element 630. This diagram is merely example, which should not unduly limit the scope of the claims herein. One of ordinary skill in the art would recognize other variations, alternatives, and modifications. The shorter feedback coupling element 635 couples a small amount of RF energy from the resonator and provides feedback to the RF amplifier input 212 through an RF connector 621. The feedback coupling element 635 is closely received by the lamp body 600 through opening 620 and as such is not in direct DC electrical contact with the conductive surface of the lamp body. The input coupling element 630 is conductively connected with RF amplifier output 211 through RF connector 611. Input coupling element 630 is closely received by the lamp body 600 through the opening 610 and as such is not in direct electrical contact with the lamp body at the bottom surface. However, the other end of the input coupling element is connected to the lamp body 600 at 631. The feedback loop between the feedback coupling element, the RF amplifier, the input coupling element, and the air resonator/waveguide results in oscillation as long as the amplifier has gain at the resonant frequency of the resonator that is larger than the feedback loop losses and the phase of the feedback loop satisfies steady state oscillation conditions. The RF power from the amplifier is coupled to the output coupling element 120 by the input coupling element. The output coupling element couples the RF energy to the bulb resulting in ionization of the inert gas followed by vaporization of the light emitter which then results in light emission from the bulb. Of course, there can be other variations, modifications, and alternatives.

Figure 5A:
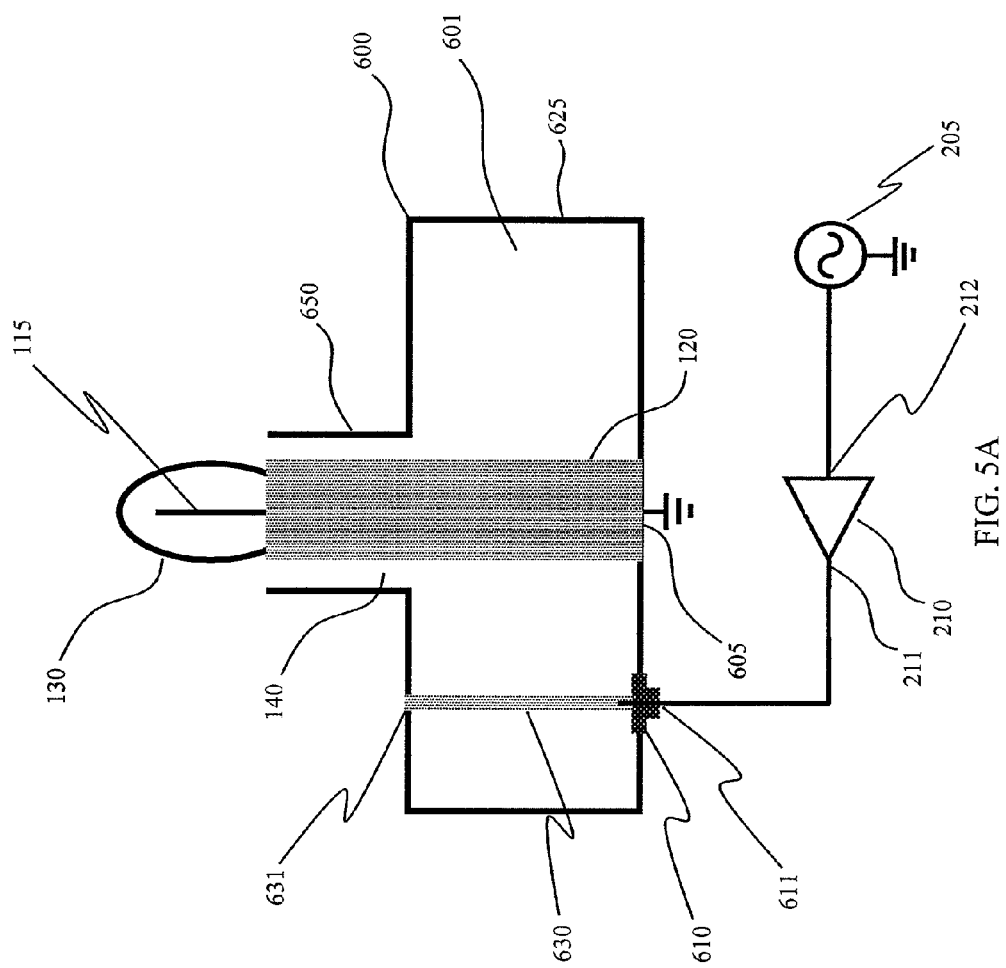
FIG. 5A illustrates a simplified diagram of the lamp in FIG. 3 without the feedback coupling element. An RF source that may comprise an oscillator and an amplifier is connected to the input coupling element according to an embodiment of the present invention.

FIG. 5A illustrates a lamp similar to FIG. 4 except that the feedback coupling element has been eliminated. This diagram is merely example, which should not unduly limit the scope of the claims herein. One of ordinary skill in the art would recognize other variations, alternatives, and modifications. Instead the RF source is provided by an oscillator 205 and an RF amplifier 210 with the output of the oscillator connected to the input 212 of the RF amplifier 210 and the output of the amplifier 211 is conductively connected with the input coupling element 630 through an RF connector 611. The input coupling element delivers RF power to the output coupling element 120 which then couples it to the gas filled vessel 130. This illustration is merely an example, which should not unduly limit the scope of the claims herein. One of ordinary skill in the art would recognize other variations, modifications, and alternatives.

Figure 5B:
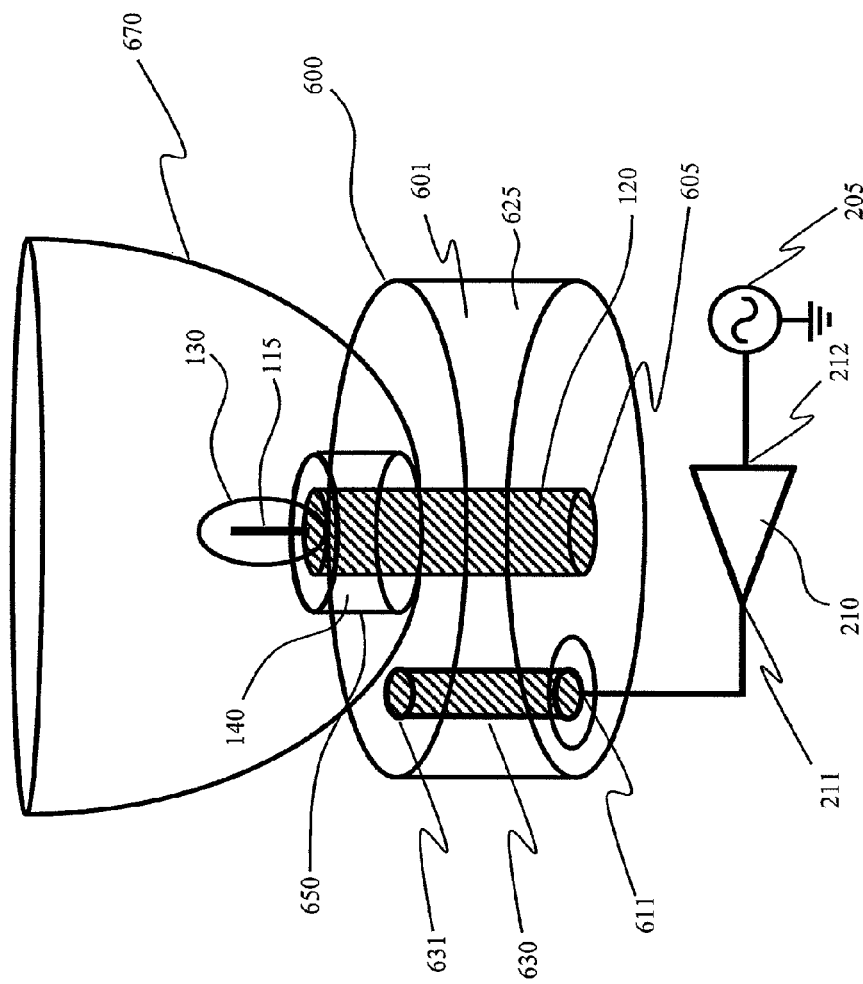
FIG. 5B is a simplified perspective view of the lamp in FIG. 5A showing the input coupling element, the integrated bulb/output coupling element assembly consisting of the output coupling element and a gas filled vessel (bulb), and a reflector according to an embodiment of the present invention.

FIG. 5B is a perspective view of the lamp shown in FIG. 5A with an added reflector 670. The luminous output from the bulb 130 is collected and directed by an external reflector 670, which is either electrically conductive or if it is made from a dielectric material has an electrically conductive backing, and which is attached to and in electrical contact with the lamp body 600. Reflector 670 is depicted as parabolic in shape with bulb 130 positioned near its focus. Those of ordinary skill in the art will recognize that a wide variety of possible reflector shapes can be designed to satisfy beam direction and distribution requirements. In a specific embodiment, the shapes can be conical, convex, concave, trapezoidal, pyramidal, or any combination of these, and the like. This illustration is merely an example, which should not unduly limit the scope of the claims herein. One of ordinary skill in the art would recognize other variations, modifications, and alternatives.

FIG. 6A is a cross-sectional perspective view of the lamp in FIG. 5B without the RF source and the reflector. The input coupling element 630 is shown connected to the top surface 631 of the conductive lamp body of the compact air resonator/waveguide 600. In this embodiment the integrated bulb/output coupling element assembly 120 is shown (unassembled) with a tapped screw bottom that can screw into the bottom of the conductive lamp body 605. In this case the output coupling element is made from a solid conductor but it is possible to make it from a dielectric material with an electrically conductive layer. Since there are no electric fields inside the dielectric material the RF losses of the dielectric support structure used is not important. Other attachment methods such as using set screws is possible for connecting the output coupling element to the lamp body. This illustration is merely an example, which should not unduly limit the scope of the claims herein. One of ordinary skill in the art would recognize other variations, modifications, and alternatives.

FIG. 6B is similar to FIG. 6A but in this case the output coupling element 120 is screwed into the bottom of the conductive lamp body 605. This diagram is merely example, which should not unduly limit the scope of the claims herein. One of ordinary skill in the art would recognize other variations, alternatives, and modifications. The gap 140 between the output coupling element 120 and the lamp body 650 as well as the length and the diameter of the output coupling element 120 are important in determining the resonant frequency of the air resonator/waveguide.

FIGS. 7A, 7B, 7C, and 7D illustrate some possible variations in the design of the compact air resonator/waveguide to achieve the same resonant frequency. Numerous other variations are possible giving the designer flexibility in the design of the compact air resonator/waveguide. By adjusting the length of the output coupling element 120, the length of the top section of the lamp body 650 versus the size of the bottom section 625 as shown in FIG. 7B it is possible to achieve the same resonant frequency as the air resonator/waveguide shown in FIG. 7A. Another possibility is to change the air gap 140 between the top section 650 and the output coupling element 120 as shown in FIG. 7C but use a shorter top section 650 to achieve the same resonant frequency. In FIG. 7D part of the top section 650 of the air resonator is tapered to allow more gradual transition from the bottom section 625 to the top section. Many other variations are possible including changing the diameter of the output coupling element 120 or changing the dimensions of the bottom section 625 to change the resonant frequency of the air resonator/waveguide. These illustrations are merely some examples, which should not unduly limit the scope of the claims herein. One of ordinary skill in the art would recognize other variations, modifications, and alternatives.

Figure 8:
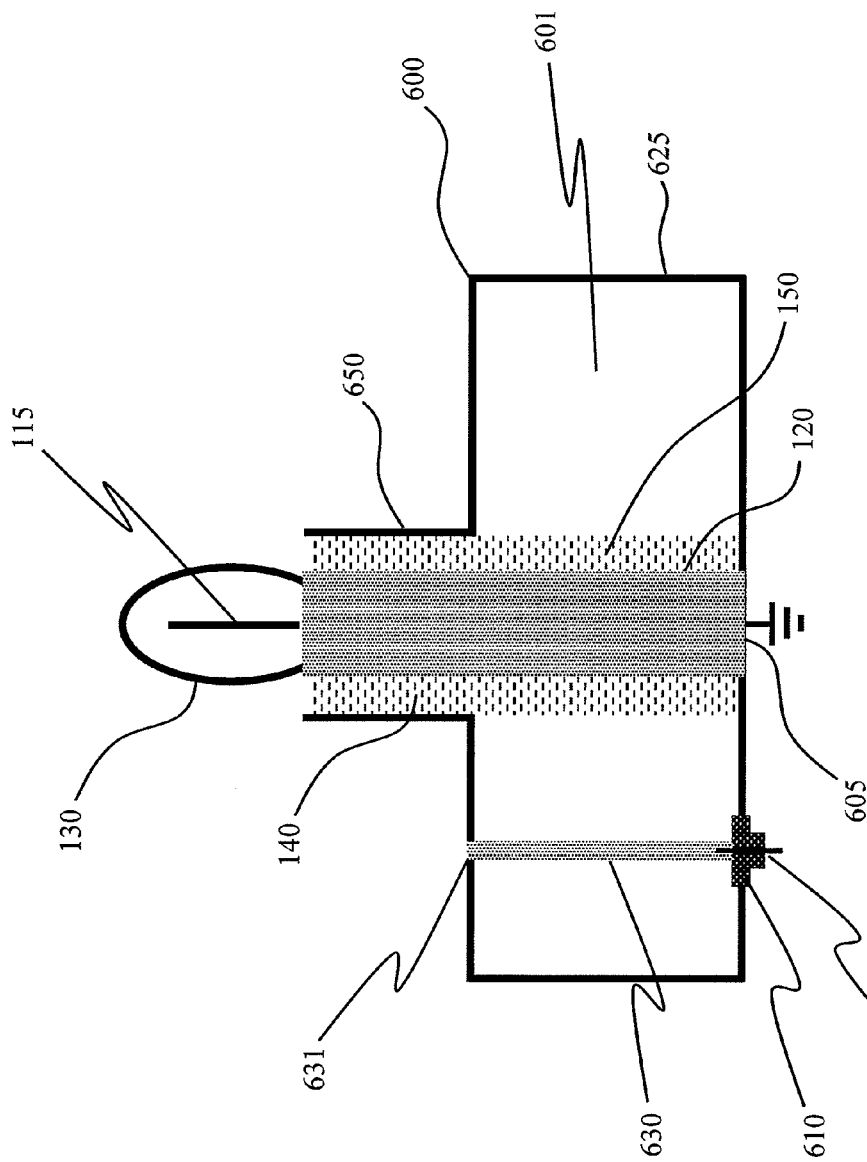
FIG. 8 shows a simplified diagram of another embodiment of the present invention in which a dielectric sleeve is inserted around the output coupling element.

FIG. 8 shows another embodiment of the present invention in which a dielectric sleeve 150 is inserted around the output coupling element 120. This diagram is merely example, which should not unduly limit the scope of the claims herein. One of ordinary skill in the art would recognize other variations, alternatives, and modifications. The dielectric sleeve increases the capacitance in the gap 140 between the output coupling element 120 and the top section of the lamp body 650 resulting in lowering the resonant frequency of the resonator/waveguide. The dielectric sleeve can be made from a material such as quartz but other materials are possible. One of ordinary skill in the art would recognize other variations, modifications, and alternatives.

Figure 9:
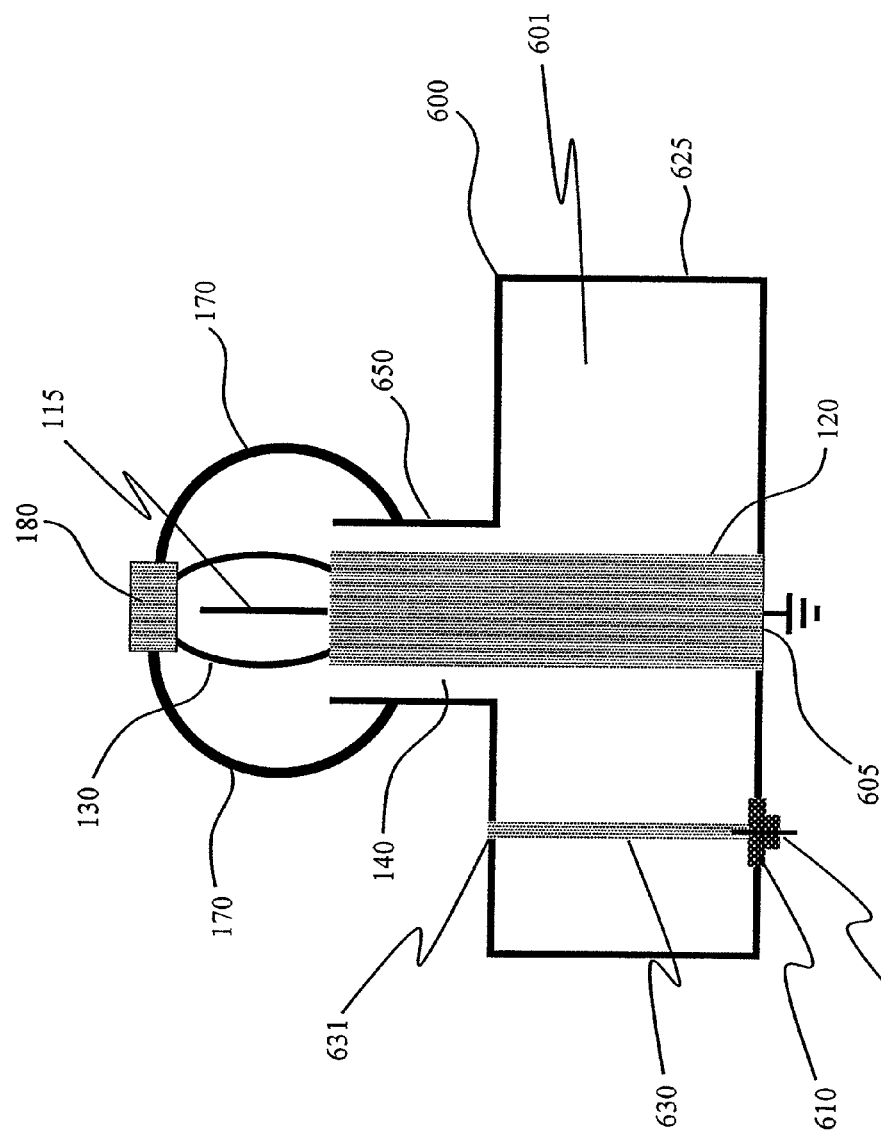
FIG. 9 shows another simplified diagram embodiment of the present invention in which the top of the gas filled vessel (bulb) is electrically connected to the lamp body via wires or straps.

FIG. 9 shows another embodiment of the present invention. This diagram is merely example, which should not unduly limit the scope of the claims herein. One of ordinary skill in the art would recognize other variations, alternatives, and modifications. The resonator is similar to the resonator in FIG. 5A except that the top of the gas filled vessel is electrically connected to the resonator body 600 through a post 180 and wires or straps 170. The post 180 can be made from a solid conductor or it can be made from a dielectric material with a conductive coating. In the case that it is made from a solid conductor a thin layer of dielectric material or refractory material can be used as a barrier between the post and the bulb.

Figure 10:
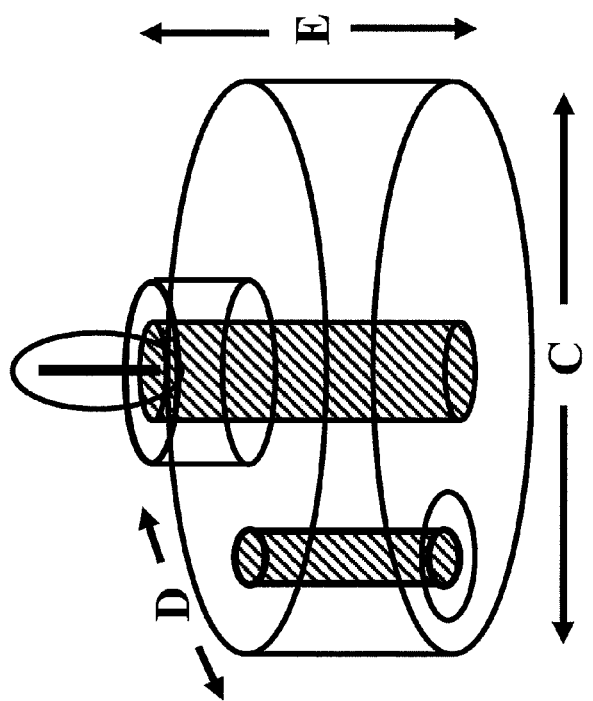
FIG. 10 is similar to FIG. 5B showing an embodiment of the compact air resonator/waveguide without the reflector and the RF source. The maximum dimensions of the compact air resonator/waveguide are less than ½ of the free space wavelength of the resonant frequency of the fundamental mode of the air resonator/waveguide.

FIG. 10 is similar to FIG. 5B showing an embodiment of the compact air resonator/waveguide without the reflector and the RF source. This diagram is merely example, which should not unduly limit the scope of the claims herein. One of ordinary skill in the art would recognize other variations, alternatives, and modifications. The maximum dimension (dimensions C, D, and E in the Figure) of the compact air resonator/waveguide of any one dimension in a three coordinate system (XYZ) is less than ½ of the free space wavelength of the resonant frequency of the fundamental mode of the air resonator/waveguide. As shown in a specific embodiment, the present invention provides a plasma lamp apparatus. The apparatus includes a gas filled vessel having a transparent or translucent body configured by an inner region and an outer surface region, a cavity being defined within the inner region. The apparatus also has an air resonator region configured within a vicinity of the gas filled vessel. In a specific embodiment, the air resonator region has a maximum dimension of less than ½ of a free space wavelength of a fundamental resonant frequency of the air resonator region. The apparatus has an rf source configured to generate a resonant frequency of 2.5 GHz and less and coupled to the air resonator region. Of course, there can be other variations, modifications, and alternatives.

In alternative specific embodiments as shown, the present invention provides an alternative plasma lamp apparatus. The apparatus has a waveguide body having a maximum dimension of less than ½ of a free space wavelength of a resonant frequency. The maximum dimension is selected from any one dimension in a three coordinate system. Of course, there can be other variations, modifications, and alternatives.

FIG. 11 shows the temperature profile of the surface of the gas filled vessel (in this case a quartz bulb) as a function of the distance above the output coupling element. The bulb as well as part of the top portion of the resonator/waveguide from FIG. 3 is shown on the right hand side of FIG. 11. This diagram is merely example, which should not unduly limit the scope of the claims herein. One of ordinary skill in the art would recognize other variations, alternatives, and modifications. In this case the bulb is operated in the vertical direction. The maximum temperature of around 852° C. occurs approximately at ⅔ of the length of the bulb above the end of the output coupling element. The lowest temperature of around 783° C. occurs just slightly above the end of the output coupling element which in this case is also in close proximity to the maximum Electric field region inside the bulb. Depending on the orientation of the bulb, design of the resonator (including dimensions of the output coupling element and materials used to make it) as well as the shape and size of the bulb, as well as other parameters, one can change the temperature profile of the surface of the bulb. Of course, there can be other variations, modifications, and alternatives.

In still an alternative embodiment as shown, the present invention provides still an alternative plasma lamp apparatus. The apparatus has a gas filled vessel having a transparent or translucent body configured by an inner region and an outer surface region and a cavity being defined within the inner region. In a specific embodiment, the gas filled vessel has a first end portion and a second end portion. The apparatus has a maximum temperature profile spatially disposed within a center region of the gas filled vessel in a preferred embodiment, although the maximum may be slightly offset in some cases. In a specific embodiment, the center region is between the first end portion and the second end portion. In a preferred embodiment, the maximum temperature profile is within a vicinity of the outer surface region substantially free from interference with a solid resonator body region. Of course, there can be other variations, modifications, and alternatives.

Figure 12A:
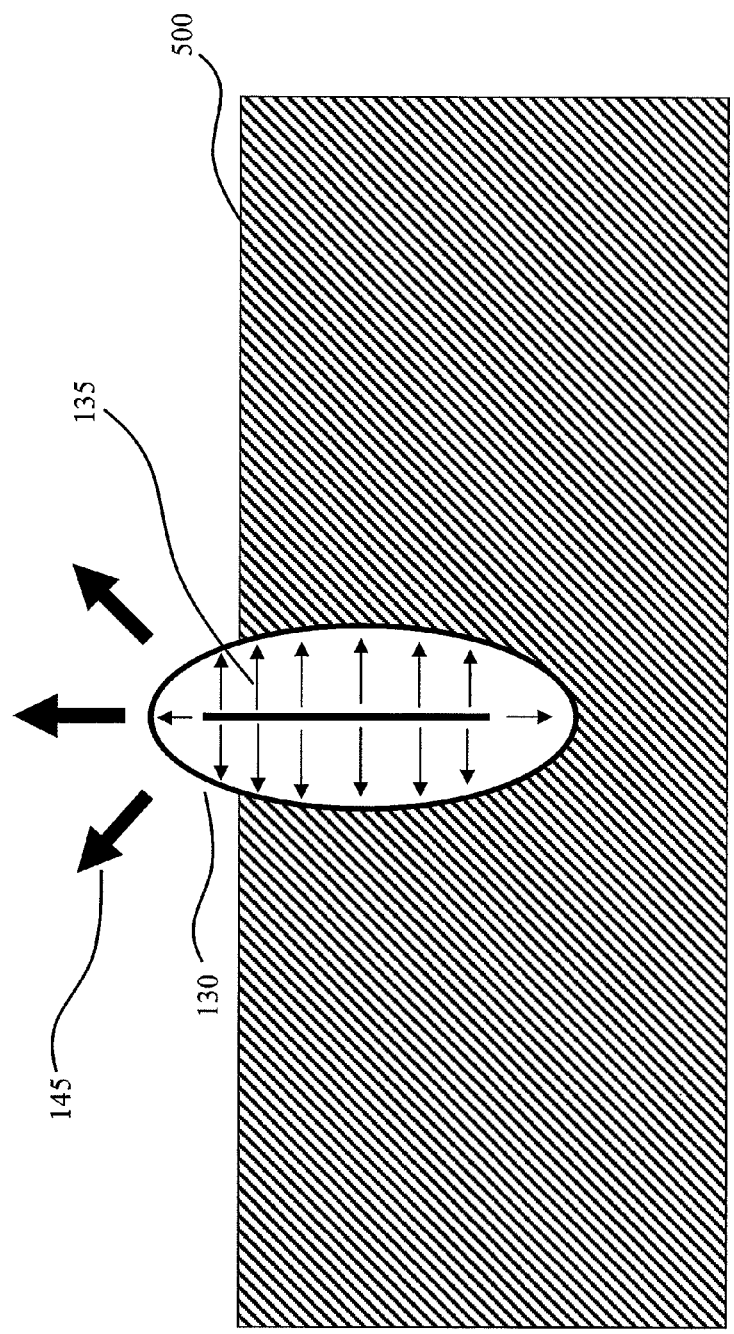
FIG. 12A shows a simplified cross sectional view of a gas filled vessel in a conventional dielectric resonator showing that the majority of the light from the arc gets reflected back into the bulb before eventually exiting the top surface of the bulb.

FIG. 12A shows a simplified cross sectional view of a gas filled vessel 130 in a conventional dielectric resonator 500 and FIG. 12B shows a simplified cross sectional view of a gas filled vessel 130 in an embodiment 600 of the present invention. This diagram is merely example, which should not unduly limit the scope of the claims herein. One of ordinary skill in the art would recognize other variations, alternatives, and modifications. As one can see in FIG. 12A in the case of the conventional dielectric resonator the majority of the light from the arc of the bulb (135) will first hit the opaque walls of the dielectric resonator since most of the bulb is inside the dielectric resonator and the light gets reflected back into the bulb. Part of this reflected light gets absorbed by the arc and then re-emitted. The light continues to bounce back and forth until it is emitted (145) from the top surface of the bulb. Typically a reflective coating or material is used to surround the bulb (except for the top surface) to reduce reflective losses but nevertheless some of the reflected light is lost in the process. In the case of the compact air resonator/waveguide 600 shown in FIG. 12B the majority of the emitted light 135 from the arc of the bulb pass through the walls of the transparent or translucent gas filled vessel without being reflected back into the bulb. The light emitted from the surface of the bulb 145 is emitted from most of the surface of the bulb without having gone through multiple reflections. Of course, there can be other variations, modifications, and alternatives.

As shown, the present invention provides a plasma lamp apparatus according to one or more embodiments. The apparatus comprises a gas filled vessel having a transparent or translucent body configured by an inner region and an outer surface region, a cavity being defined within the inner region and an rf source coupled to the gas filled vessel to cause electromagnetic radiation to pass through at least 50% of the outer surface region without reflection back into the inner region of the gas filled vessel. Moreover, the present invention provides a method for emitting electromagnetic radiation from a plasma lamp apparatus. The method includes generating electromagnetic radiation from within an inner region of a gas filled vessel using at least one or more rf sources configured to provide rf energy to the gas filled vessel and transmitting a portion of the electromagnetic radiation from the inner region of the gas filled vessel through at least 50% of an outer surface region of the gas filled vessel without substantial refection back into the inner region of the gas filled vessel. Of course, there can be other variations, modifications, and alternatives.

Figure 13B:
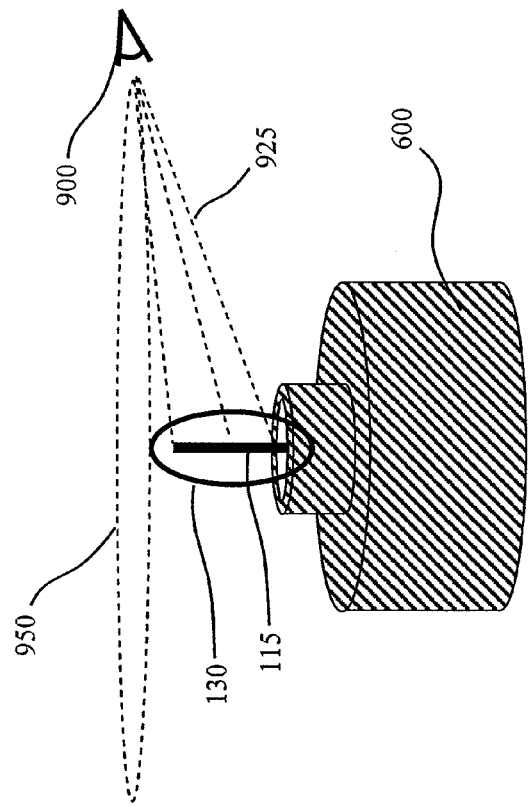
FIG. 13B shows a simplified diagram of a perspective view of one of the embodiments of this invention demonstrating that from the perspective of a viewer the majority of the arc is visible including as the viewer moves 360 degrees around the air resonator/waveguide.
Figure 13A:
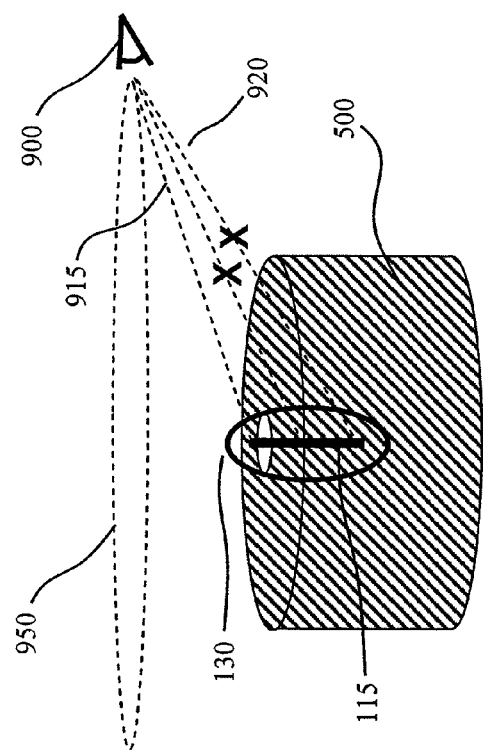
FIG. 13A shows a simplified diagram of a perspective view of a conventional dielectric resonator demonstrating that from the perspective of a viewer only the top portion of the arc is visible and the view to the majority of the arc is blocked by the opaque dielectric resonator.

FIG. 13A shows a perspective view of a conventional dielectric resonator 500 and FIG. 13B shows a perspective view of an embodiment of the present apparatus 600 according to an embodiment of the present invention. From the perspective of a viewer 900 in FIG. 13A looking at the arc of the bulb 115 only the top portion of the arc is visible (top dashed line of sight 915). The other two line of sights (two dashed lines marked with an X 920) to the middle and bottom of the arc are blocked by the opaque dielectric resonator. If the viewer moves around 360 degrees in a circle around the dielectric resonator (circular dashed line 950) still only the top of the arc is visible to the observer. In the case of the compact air resonator/waveguide 600 shown in FIG. 13B a viewer 900 has a clear line of sight to the bottom, middle, and top of the arc of the bulb 115 (three dashed lines 925). In addition if the viewer moves around 360 degrees in a circle around the compact air resonator (circular dashed line 950), the viewer will have a clear view of the arc of the bulb. Of course, there can be other variations, modifications, and alternatives.

The present invention provides an electrode-less plasma lamp apparatus in yet an alternative embodiment as shown. The apparatus has a gas filled vessel having transparent or translucent body configured by an inner region and an outer surface region, a cavity being defined within the inner region, which is free from one or more electrode structures. The apparatus has a support body configured to mate with the gas filled vessel and an arc feature caused by electromagnetic radiation and having a first end and a second end provided spatially within the inner region. In a preferred embodiment, at least 50% of the arc feature is exposed when viewed from any spatial position within 360 Degrees and greater of an imaginary line normal to a center portion between the first end and the second end of the arc feature. In one or more embodiments, the arc feature is provided within the spatial region between a first end and a second end of the inner region. Of course, there can be other variations, modifications, and alternatives.

In yet other embodiments, the present invention provides an electrode-less plasma lamp apparatus. The apparatus has a gas filled vessel having transparent or translucent body configured by an inner region and an outer surface region and a cavity being defined within the inner region, which is free from one or more electrode structures. The apparatus also has a maximum electric field region configured within a portion of the inner region of the gas filled vessel. In a specific embodiment, the maximum electric field region is exposed from an exterior region of the gas filled vessel when viewed from any spatial position within 360 Degrees and greater of an imaginary line normal to a center portion of the gas filled vessel.

Figure 14B:
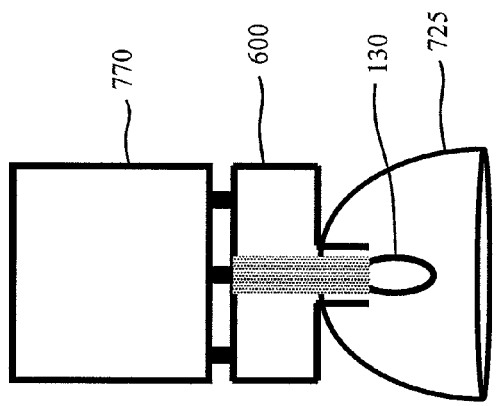
FIG. 14B shows a simplified diagram of a luminaire using one of the embodiments of this invention using a very compact gas filled vessel which is acting as a point light source.
Figure 14A:
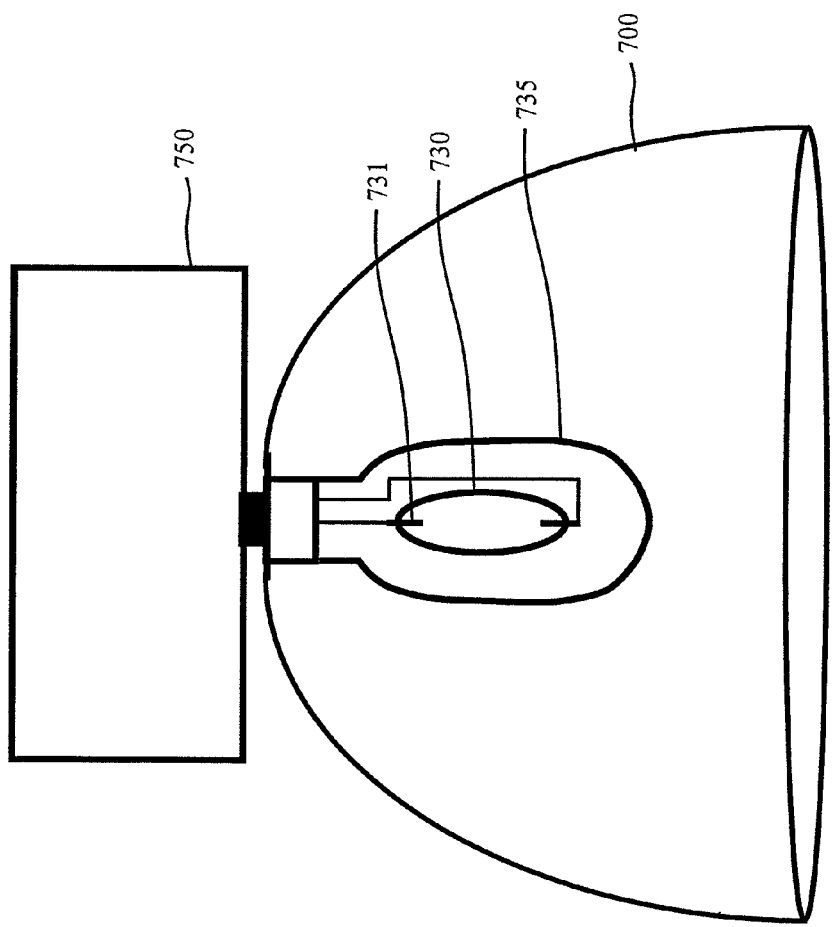
FIG. 14A shows a simplified diagram of a luminaire using a conventional metal halide lamp with electrodes inside the bulb.

FIG. 14A shows a luminaire using a metal halide lamp 730 with electrodes inside the bulb 731. A secondary glass/quartz envelope 735 surrounds the gas filled vessel 731. A ballast 750 is used to operate the lamp. In this case since the arc of the bulb is large it is difficult to design compact low-cost reflector 700 that can efficiently collect all the light that the bulb generates. In the case of a luminaire designed using one of the embodiments of this invention, FIG. 14B, the gas filled vessel (bulb) 130 is compact so it can be treated as a point light source in designing reflectors. As a result from compact and efficient reflectors 725 can be designed to collect all the light that the bulb generates. In this case an RF driver/ballast 770 is used to operate the lamp. In one or more embodiments, the invention preferably provides a single source plasma lamp apparatus. The apparatus has a single point source configured to be electrode-less and having a maximum dimension of 3 centimeters and less and an emission of electromagnetic radiation having at least 20,000 lumens emitted from the single point source. As shown, the present apparatus eliminates the use of arrays of lamps and other complex cumbersome designs. This diagram is merely example, which should not unduly limit the scope of the claims herein. One of ordinary skill in the art would recognize other variations, alternatives, and modifications.

Figure 15:
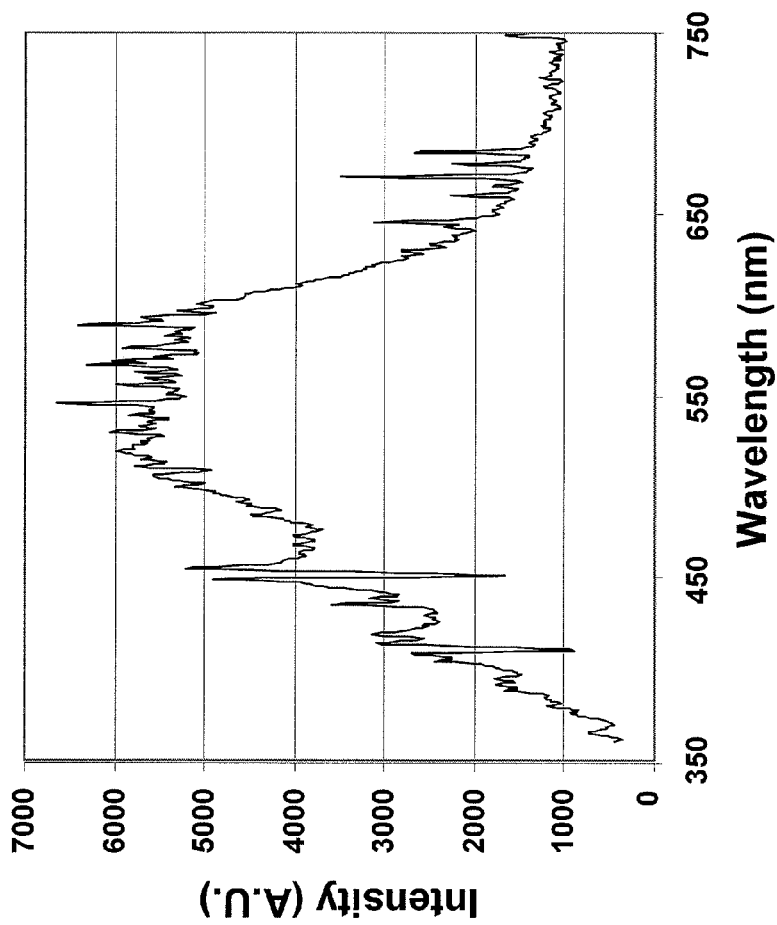
FIG. 15 shows a simplified diagram of an example of the spectrum emitted from one of the embodiments of this invention. The spectrum has emission in the visible, ultraviolet, and infrared region of the spectrum.

FIG. 15 shows an example of the spectrum emitted from one of the embodiments of this invention. This diagram is merely example, which should not unduly limit the scope of the claims herein. One of ordinary skill in the art would recognize other variations, alternatives, and modifications. The spectrum has emission in the visible, ultraviolet, and infrared region of the spectrum. By changing the light emitters inside the gas filled vessel one can change the spectral characteristics of the emitted light. The device is also provided in one or more embodiments. The device comprises an rf source; an electromagnetic resonator structure coupled to at least one rf coupling element configured to introduce rf energy into the electromagnetic resonator structure and a bulb comprising a fill material. The bulb is coupled to the electromagnetic resonator structure to emit electro-magnetic energy from a spectrum of at least ultra-violet, visible, or infrared; and an exposed region of the bulb protruding outside of the electromagnetic resonator structure to cause a substantial portion of the electromagnetic radiation to be emitted from exterior surfaces of the bulb without reflection from the electromagnetic resonator structure. In one or more embodiments, the spectrum may include combinations of the above as well as other regions. Of course, there can be various combinations, alternatives, and variations.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A plasma lamp apparatus comprising:
a gas filled vessel having a transparent or translucent body configured by an inner region and an outer surface region, a cavity being defined within the inner region;
an air resonator region configured within a vicinity of the gas filled vessel, the air resonator region having a maximum dimension of less than ½ of a free space wavelength of a fundamental resonant frequency of the air resonator region; and
an rf source configured to generate a resonant frequency of 2.5 GHz and less and coupled to the air resonator region.

2. Apparatus of claim 1 wherein the ½ wavelength is a free space wavelength and the air resonator region is a cavity air resonator.

3. A plasma lamp apparatus comprising:
a gas filled vessel having a transparent or translucent body configured by an inner region and an outer surface region, a cavity being defined within the inner region; and
an rf source coupled to the gas filled vessel connected to only one coupling element, the output coupling element being shaped to closely receive the gas filled vessel such that a first portion of the outer surface region of the gas filled vessel is disposed inside the output coupling element and a second portion of the outer surface region of the gas filled vessel is exposed outside the output coupling element to cause electromagnetic radiation to pass through at least 50% of the outer surface region without reflection back into the inner region of the gas filled vessel.

4. Apparatus of claim 3 wherein the electromagnetic radiation is visible light.

5. Apparatus of claim 3 wherein the electromagnetic radiation comprises UV, visible, or IR.

6. A method for emitting electromagnetic radiation from a plasma lamp apparatus, the method comprising:
generating electromagnetic radiation from within an inner region of a gas filled vessel using at least one or more rf sources configured to provide rf energy to the gas filled vessel, the gas filled vessel connected to only one RF coupling element, the output coupling element being shaped to closely receive the gas filled vessel such that a first portion of the outer surface region of the gas filled vessel is disposed inside the output coupling element and a second portion of the outer surface region of the gas filled vessel is exposed outside the output coupling element; and
transmitting a portion of the electromagnetic radiation from the inner region of the gas filled vessel through at least 50% of an outer surface region of the gas filled vessel without substantial refection back into the inner region of the gas filled vessel.

7. An electrode-less plasma lamp apparatus comprising:
a gas filled vessel having transparent or translucent body configured by an inner region and an outer surface region, a cavity being defined within the inner region, the inner region being free from one or more electrode structures;
a support body configured to mate with the gas filled vessel;
an arc feature caused by electromagnetic radiation and having a first end and a second end provided spatially within the inner region; and
at least 50% of the arc feature exposed when viewed from any spatial position within 360 Degrees and greater of an imaginary line normal to a center portion between the first end and the second end of the arc feature.

8. Apparatus of claim 7 wherein the arc feature is provided within the spatial region between a first end and a second end of the inner region.

9. An electrode-less plasma lamp apparatus comprising:
a gas filled vessel having transparent or translucent body configured by an inner region and an outer surface region, a cavity being defined within the inner region, the inner region being free from one or more electrode structures; and
a maximum electric field region configured within a portion of the inner region of the gas filled vessel, the maximum electric field region being exposed from an exterior region of the gas filled vessel when viewed from any spatial position within 360 Degrees and greater of an imaginary line normal to a center portion of the gas filled vessel.

10. Apparatus of claim 9 wherein the maximum electric field region is derived from one or more rf sources coupled to the gas filled vessel.

11. Apparatus of claim 9 further comprising a waveguide body coupled to the gas filled vessel whereupon the maximum electric field region in the gas filled vessel being disposed spatially outside of the waveguide body.

12. Apparatus of claim 9 wherein the maximum electric field region is substantially from a vicinity of an opaque material.

13. Apparatus of claim 9 wherein the maximum electric field region is characterized by an electromagnetic field peak, the electromagnetic field peak being one of a plurality of peaks.

14. Apparatus of claim 9 wherein the maximum electric field region is one of a plurality of maximum electric field regions.

* * * * *